US007898134B1

(12) United States Patent
Shaw

(10) Patent No.: US 7,898,134 B1
(45) Date of Patent: Mar. 1, 2011

(54) BRUSHLESS DISK DC MOTOR

(75) Inventor: Bill S. Shaw, Austin, TX (US)

(73) Assignee: Bill S. Shaw, Austin, TX (US)

( * ) Notice: Subject to any disclaimer, the term of this patent is extended or adjusted under 35 U.S.C. 154(b) by 0 days.

(21) Appl. No.: 12/655,561

(22) Filed: Dec. 31, 2009

(51) Int. Cl.
*H02K 16/00* (2006.01)

(52) U.S. Cl. .................... 310/114; 310/113; 310/112

(58) Field of Classification Search ......... 310/112–114, 310/265–267, 216.55, 216.63, 156.12, 156.13, 310/156.37
See application file for complete search history.

(56) References Cited

U.S. PATENT DOCUMENTS

| 4,187,441 | A | | 2/1980 | Oney |
| 4,547,713 | A | | 10/1985 | Langley et al. |
| 4,801,830 | A | | 1/1989 | Ogino et al. |
| 4,982,125 | A | | 1/1991 | Shirakawa |
| 5,208,503 | A | * | 5/1993 | Hisey .................. 310/216.054 |
| 5,637,945 | A | | 6/1997 | Yamamuro et al. |
| 5,689,147 | A | | 11/1997 | Kaneda et al. |
| 5,747,910 | A | | 5/1998 | Haner |
| 6,154,013 | A | * | 11/2000 | Caamano ..................... 322/89 |
| 6,259,233 | B1 | * | 7/2001 | Caamano ..................... 322/89 |
| 6,727,632 | B2 | * | 4/2004 | Kusase ....................... 310/266 |
| 6,992,419 | B2 | * | 1/2006 | Kim et al. ................... 310/266 |
| 7,030,534 | B2 | * | 4/2006 | Caamano ................. 310/254.1 |
| 7,356,906 | B2 | * | 4/2008 | Kim et al. ...................... 29/596 |
| 7,358,639 | B2 | * | 4/2008 | Caamano ............. 310/216.023 |
| 7,443,074 | B2 | * | 10/2008 | Kim et al. ................... 310/266 |
| 7,548,008 | B2 | * | 6/2009 | Jansen et al. ................ 310/266 |
| 7,652,406 | B2 | * | 1/2010 | Kim et al. ................... 310/266 |
| 7,692,357 | B2 | * | 4/2010 | Qu et al. ..................... 310/266 |

* cited by examiner

*Primary Examiner*—Thanh Lam
(74) *Attorney, Agent, or Firm*—William E. Hein

(57) ABSTRACT

A brushless disk DC motor that exhibits high power density and light weight and is capable of power regeneration and reverse operation employs a flat circular non-ferrous stator plate having a plurality of electromagnets mounted in a ring pattern on an inner face thereof. Permanent magnets are mounted in equal numbers in inner and outer ring patterns on the outer and inner cylindrical surfaces, respectively, of a pair of steel rotors of different diameter that rotate in concert. The stator plate and the pair of rotors are axially aligned such that the inner and outer rings of permanent magnets rotate adjacent to and inside and outside, respectively, the ring of electromagnets. The electromagnets utilize tape-wound amorphous metal cores to minimize eddy currents and resultant iron losses and to permit the use of heavier gauge copper windings to minimize resistive power losses. A greater number of poles in the form of permanent magnets can be accommodated, the number being limited only by the diameter of the rotor, thus providing increased power and torque over prior art brushless DC motors having a limited number of poles. The present motor exhibits up to 200% more starting torque, thus eliminating the need for a gear box or clutch in electric vehicle applications.

17 Claims, 6 Drawing Sheets

BRUSHLESS DISK DC MOTOR

BACKGROUND AND SUMMARY OF THE INVENTION

This invention relates generally to DC motors and, more particularly, to a highly efficient, sealed, brushless, disk DC motor having inner and outer rings of permanent magnets mounted on cylindrical surfaces of outer and inner rotors, respectively, and having a ring of electromagnets mounted on a stator such that inwardly facing surfaces of the permanent magnets rotate in close proximity to adjacent opposite surfaces of the ring of electromagnets.

Variable speed electric motors of different types have been employed in a variety of applications over the years, most recently in electric vehicles. One such motor is the series DC motor, which employs brushes and wound coils. These motors suffer from low peak power densities on the order of 0.3 horsepower/pound. Thus, they are heavy and unresponsive, as a typical 40-horsepower motor weighs 130 pounds. They are not sealed, since air flow through the motor is required to cool the rotor, and they cannot run in reverse. Their speed is difficult to control under varying load conditions, and they have no power regeneration capability.

Three-phase AC induction motors are typically powered by a DC battery pack coupled to an DC/AC inverter and associated pulse width modulation circuitry to achieve variable speed control. These motors are characterized by heavy weight, low torque, and power factor losses.

Representative of prior art brushless DC motors are the High Power Density Brushless DC Motor described in U.S. Pat. No. 4,187,441; the Toroidally Wound Brushless DC Motor described in U.S. Pat. No. 4,547,713; and the Brushless Motors taught in U.S. Pat. Nos. 4,801,830; 4,982,125; 5,637,945; 5,689,147; and 5,747,910.

In accordance with the illustrated preferred embodiment of the present invention, a brushless DC motor employs a flat circular non-ferrous stator plate having a plurality of electromagnets mounted in a ring pattern on an inner face thereof. A plurality of permanent magnets are mounted in equal numbers in inner and outer ring patterns on the outer and inner cylindrical surfaces, respectively, of a pair of steel rotors of different diameter that rotate in concert. The stator plate and the pair of rotors are axially and diametrically aligned such that the inner ring of permanent magnets rotates in close proximity to and inside the ring of electromagnets, and the outer ring of permanent magnets rotates in close proximity to and outside the ring of electromagnets. The electromagnets utilize tape-wound amorphous metal cores to minimize eddy currents and resultant heat losses and to permit the use of heavier gauge copper windings to minimize resistive power losses and attendant heat. The DC motor of the present invention is capable of accommodating a larger number of poles, in the form of permanent magnets, than prior art brushless DC motors, the number being limited only by the diameter of the rotor, thus providing significantly increased power and torque. The precise location of the rotor is monitored through the use of three Hall effect sensors, and conventional three-phase pulse width modulation (PWM) control circuitry is employed as a source of operating power and to control the speed of the motor. The present motor exhibits higher power density and lighter weight than prior art brushless DC motors. It can be driven to 200% of its current rating to thereby double the output horsepower for short periods of time. It is reversible, is capable of power regeneration, and offers good speed control. By employing a large diameter rotor and many electromagnet pole pieces, the present motor exhibits up to 200% more starting torque than conventional brushless DC motors, thus eliminating the need for a gear box or clutch in electric vehicle applications. Since the rotor components are individually assembled and the electromagnet coils can be machine wound, the present motor can be manufactured at a cost saving over conventional AC induction motors.

DETAILED DESCRIPTION OF THE PREFERRED EMBODIMENT

Figure 1:
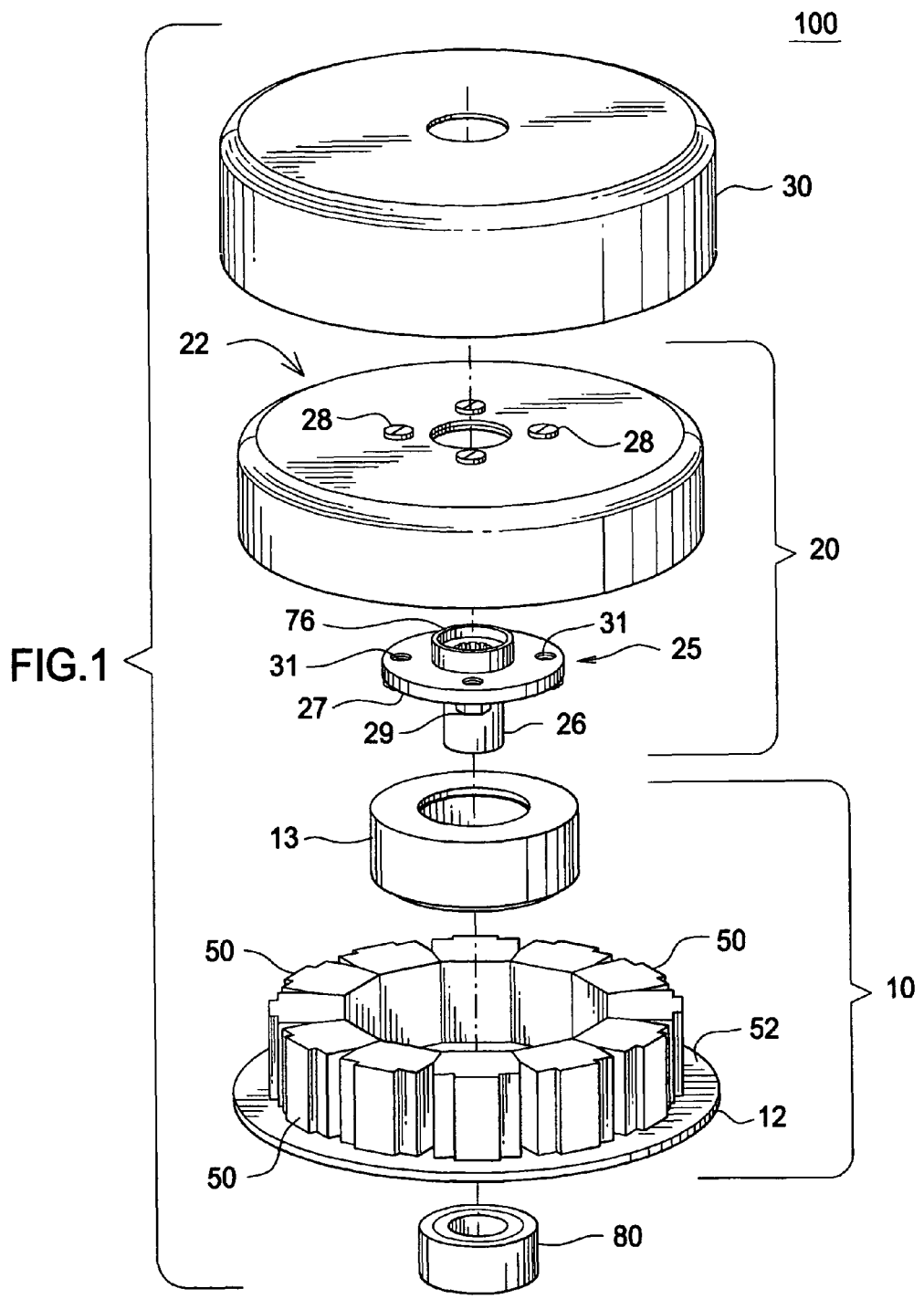
FIG. 1 is an exploded view, from the rotor end, of the brushless disc DC motor of the present invention.
Figure 2:
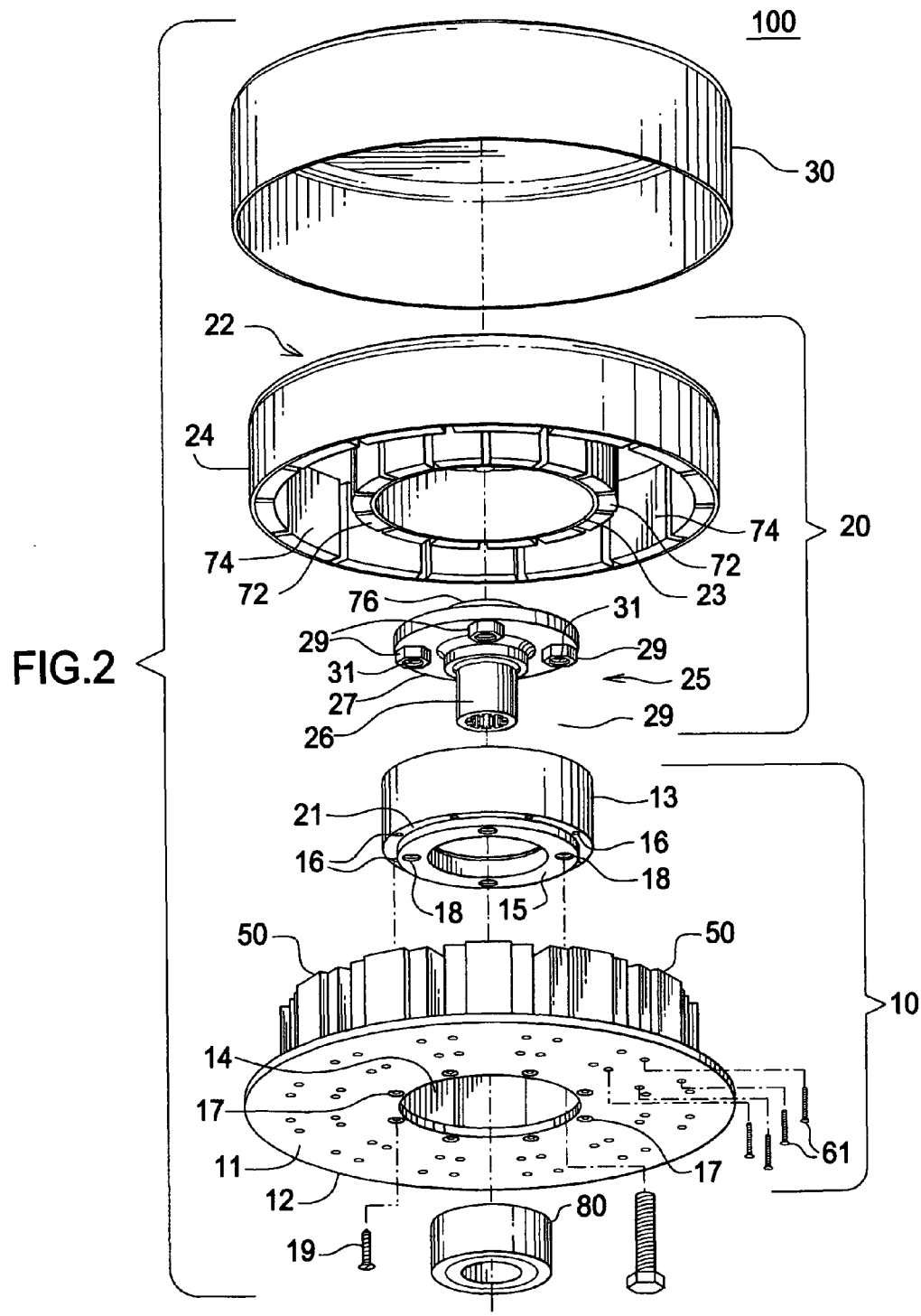
FIG. 2 is an exploded view, from the stator end, of the brushless disc DC motor of FIG. 1.
Figure 3:
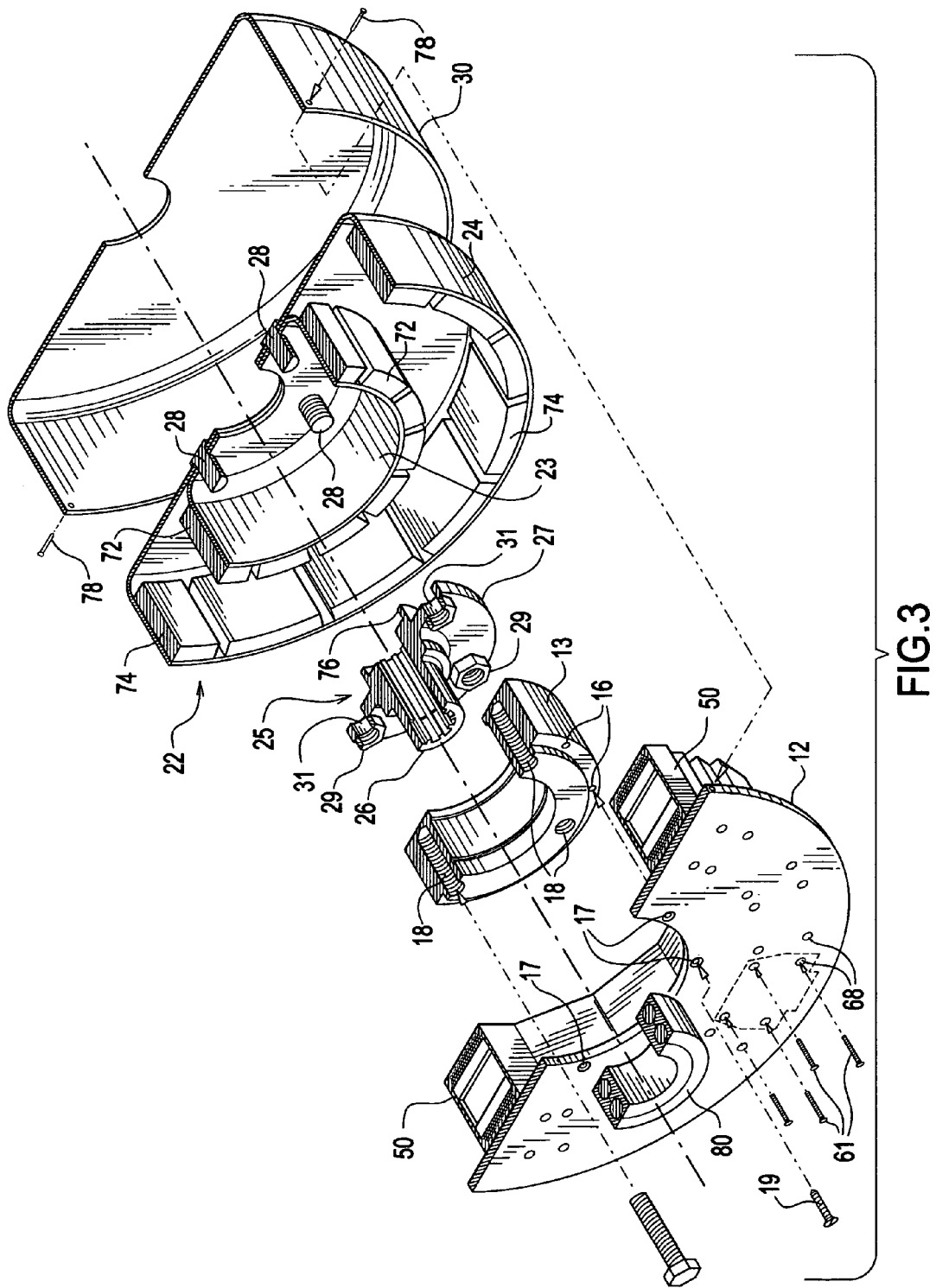
FIG. 3 is a cross-sectional exploded view, from the stator end, of the brushless disc DC motor of the present invention.
Figure 4:
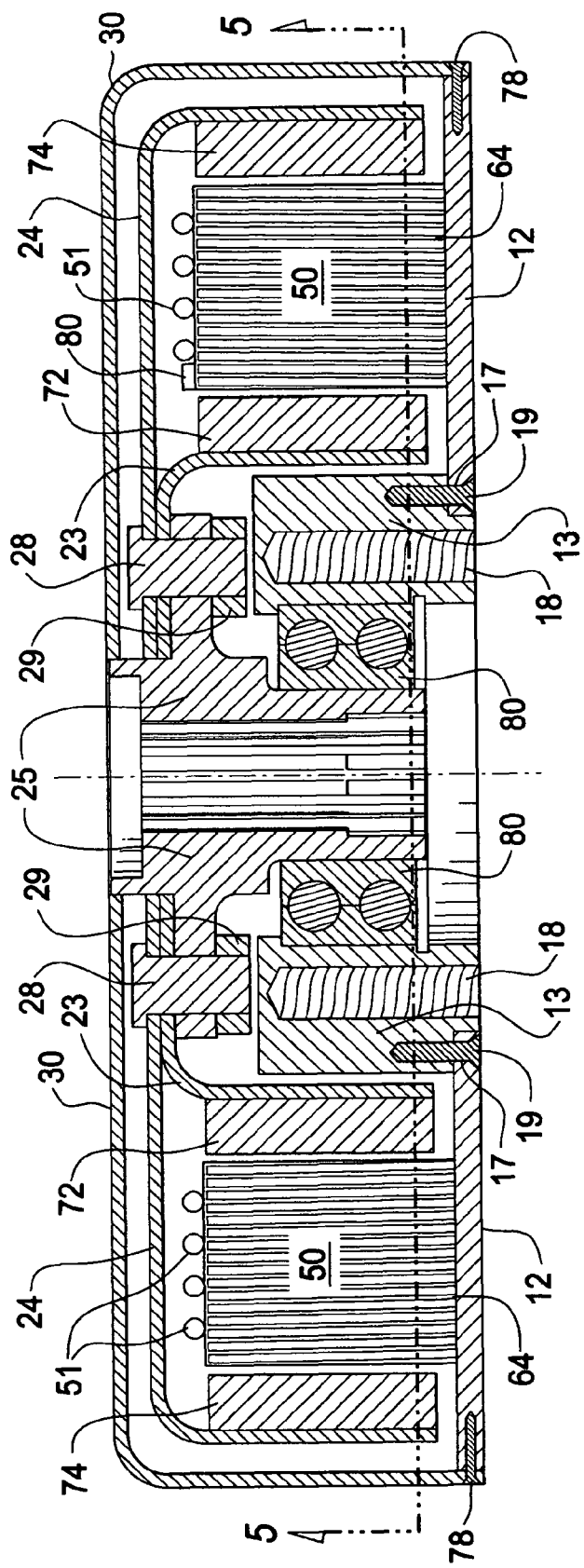
FIG. 4 is a diametrical cross-sectional elevation view of the brushless disc DC motor of the present invention, illustrating the motor components of FIGS. 1-3 in assembled form.

Referring now generally to FIGS. 1-6, there is shown a motor 100, in accordance with the present invention, that includes a stator assembly 10, a rotor assembly 20, a cover 30, and a bearing 80, all axially aligned. Stator assembly 10 includes a stator plate 12 fabricated as a flat disc of non-ferrous material such as aluminum or copper having a central circular opening 14 therein. A cylindrical stator hub 13 has a stator end of reduced outer diameter that fits into central opening 14 in stator plate 12 such that an inner face 15 of the stator end of stator hub 13 is flush with an outer surface 11 of stator plate 12. Stator hub 13 is bolted in that position to stator plate 12 by means of a plurality of bevel-headed bolts 19 inserted through countersunk bolt holes 17 in stator plate 12 and into threaded 12 bolt holes 16 in an outer step face 21 of the stator end of stator hub 13. Threaded bolt holes 18 provided in the inner face 15 of the stator end of stator hub 13 facilitate mounting of motor 100 to a vehicle structure when employed in a mobile application or to a rigid frame structure when employed in a stationary application, such as in a manufacturing facility, for example.

Figure 7:
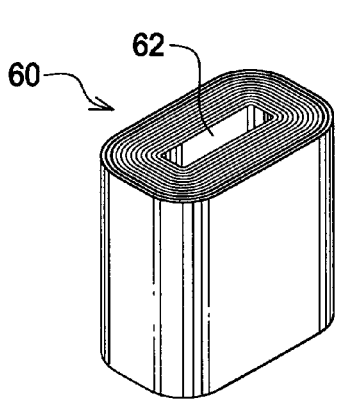
FIG. 7 is a diagram illustrating a representative one of the tape-wound amorphous metal cores employed in each of the stator electromagnets of the brushless disc DC motor of FIGS. 1-6.

Stator assembly 10 includes a plurality of electromagnet assemblies 50 that are attached in a circular pattern to an inner surface 52 of stator plate 12. Each of the electromagnet assemblies 50 includes a tape-wound amorphous metal core 60 having a rectangular central cavity 62, as illustrated in FIG. 7. The tape-wound fabrication of each of the amorphous metal cores 60 results in rounded core corners that facilitate the addition of heavy gauge copper windings 64 on the cores 60 to minimize heat-producing resistive power loss therein that follow a heat path from cores 60 through windings 64 to stator plate 12. The construction of cores 60 is advantageous over conventional motors and generators whose laminated magnetic steel stators generate excessive heat that is difficult to dissipate. Minimizing heat generation results in increased efficiency and is a critical feature of motor 100, since reducing heat losses by one-half allows power output to be doubled. In addition to facilitating the reduction of heat losses in copper windings 64, the use of amorphous metal cores 60 minimizes eddy currents and the resultant "iron losses" of prior art motors that employ laminated steel cores. Amorphous metal cores 60 allow operation at higher frequencies than is possible using conventional laminated steel cores and, hence, faster response by motor 100.

Figure 8:
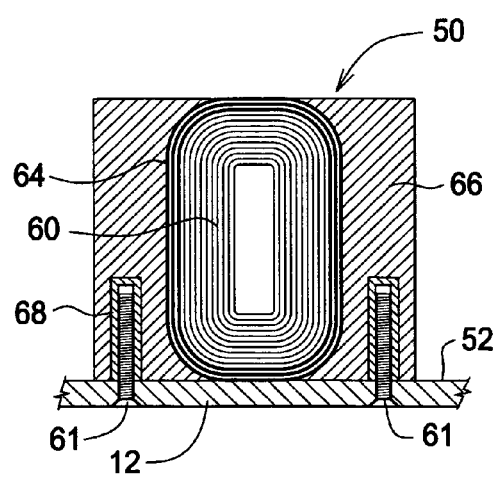
FIG. 8 is a simplified cross-sectional diagram of a representative encapsulated stator electromagnet utilizing one of the tape-wound amorphous metal cores of FIG. 7, illustrating how the encapsulated stator electromagnets are mounted to the stator plate of the motor of FIGS. 1-6 in order to provide a strong mechanical connection and good heat conduction therebetween.

The free ends of each of the copper windings 64 exit the electromagnet assemblies 50 for routing and interconnection in accordance with a desired configuration. Each amorphous metal core 60, with copper winding 64 in place, is potted or encapsulated in a volume of a heat-conducting epoxy 66, as illustrated in FIG. 8, using conventional potting methods and materials. The width of each of the electromagnet assemblies 50 is sufficiently greater than the width of each of the wound metal cores 60 so as to provide space for retaining four metal inserts 68 in the epoxy volume outside each of the wound metal cores 60. The inserts 68 open to a mounting surface of each of the electromagnet assemblies 50. Each of the electromagnet assemblies 50 is mounted to the inner surface 52 of stator plate 12 by means of four fasteners, such as screws 61 that are inserted through countersunk openings in the outer surface 11 of stator plate 12, and into the four inserts 68. Alternatively, the plurality of electromagnet assemblies 50 may be potted together as a single unit attached to the inner surface 52 of stator plate 12, with the free ends of each of the copper windings 64 exiting the outer surface 11 of stator plate 12. The free ends of the copper windings 64 may then be interconnected to configure the plurality of electromagnet assemblies 50 in series or in parallel, or as a wye or a delta, for example. The interconnection of copper windings 64 may be made by means of a circular buss attached to the outer surface 11 of stator plate 12, for example. Potting the electromagnet assemblies 50, whether individually or collectively, facilitates their attachment to stator plate 12 and mechanically strengthens the amorphous metal cores 60 to relieve stresses that may otherwise cause magnetorestriction.

Rotor assembly 20 includes a rotor 22 having concentric inner and outer cylindrical ferrous rotor bowls 23, 24, respectively, and a circular drive hub 25. Rotor bowls 23, 24 are inherently well balanced if fabricated of spun steel. Alternatively, they may be stamped from a steel plate, but this method of fabrication requires additional manufacturing operations to balance rotor assembly 20 to ensure that motor 100 runs smoothly and quietly at speeds of several thousand RPM. Fabrication of rotor bowls 23, 24 using spun steel techniques permits them to be made larger to accommodate permanent magnets in greater numbers and of higher strength, as described below, to thereby maximize the power output of motor 100. Drive hub 25 preferably includes a central splined drive shaft receiver 26 which will accept an external mating shaft at either end thereof. The protruding end of the external drive shaft may be shaped to permit its connection to any device. The external drive shaft may either be driven by motor 100, or it may be driven by an external device in those applications in which motor 100 is employed as a generator. Several of the motors 100 may be employed to form a bank of motors by stacking them on a single external splined drive shaft to thereby achieve nearly any desired level of power and torque. This arrangement also permits several smaller motors 100 to be employed in place of one large motor, thus allowing more flexibility in vehicle application design. Inner cylindrical rotor bowl 23 is formed to include an inwardly-facing open end and an outwardly-facing closed end having flat inner and outer surfaces. Outer cylindrical rotor bowl 24, of larger diameter than inner rotor bowl 23, but of equal length, is similarly formed to include an inwardly-facing open end and an outwardly-facing closed end having flat inner and outer surfaces. A central opening is provided in the closed ends of both cylindrical rotor bowls 23, 24 to allow access to drive shaft receiver 26. Drive hub 25 includes a circular mounting flange 27 with four equally-spaced mounting holes 31 therein. Bolts 28 are inserted through mounting holes correspondingly located in the closed ends of both of the inner and outer rotor bowls 23, 24 and through mounting holes 31 in drive hub 25. Nuts 29, which are integrated with drive hub 25, securely connect the inner and outer rotor bowls 23, 24 and drive hub 25 to each other.

Figure 5:
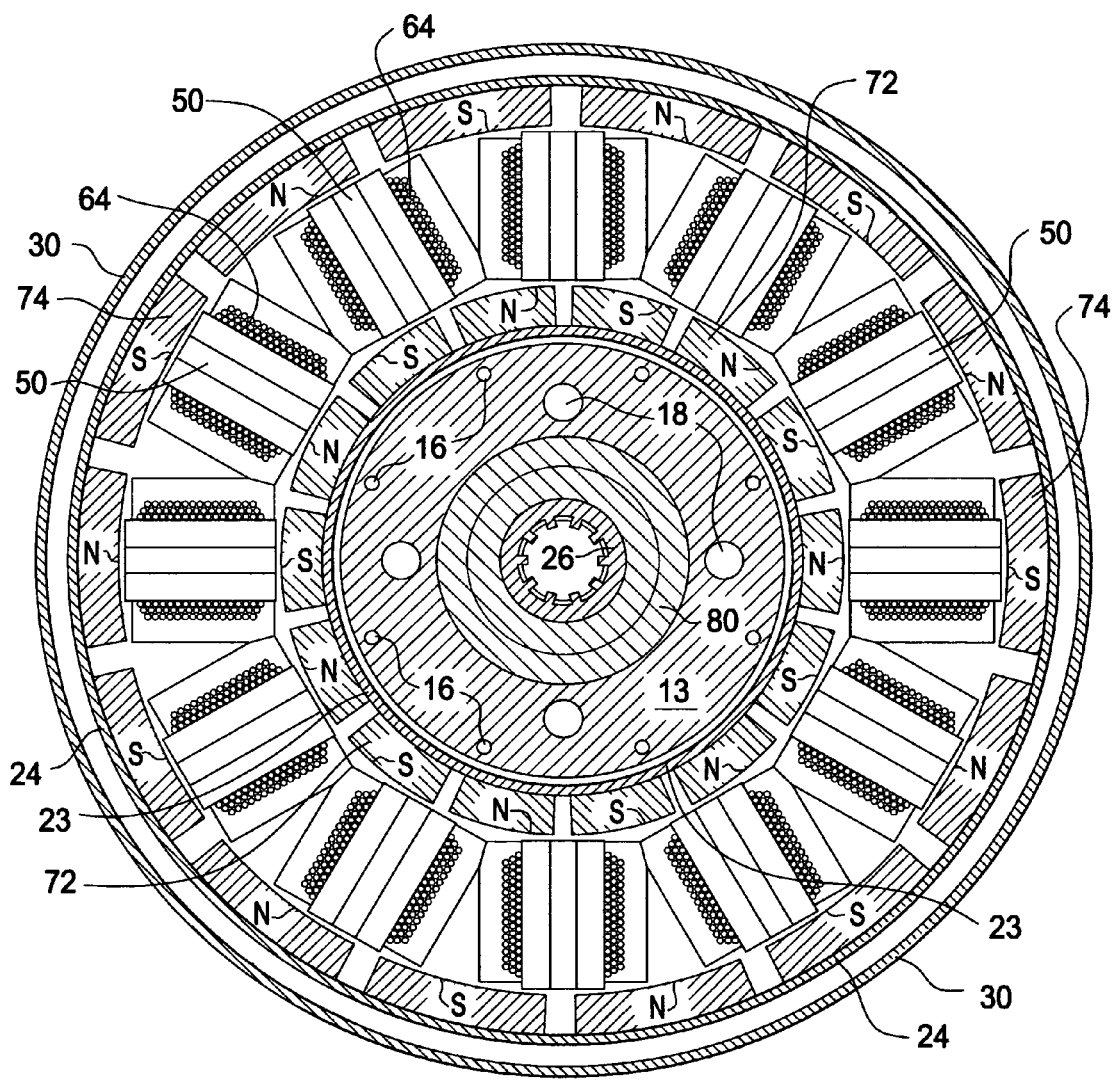
FIG. 5 is a cross-sectional plan view of the assembled motor components of FIGS. 1-3, taken along the section line 5-5 of FIG. 4.
Figure 6:
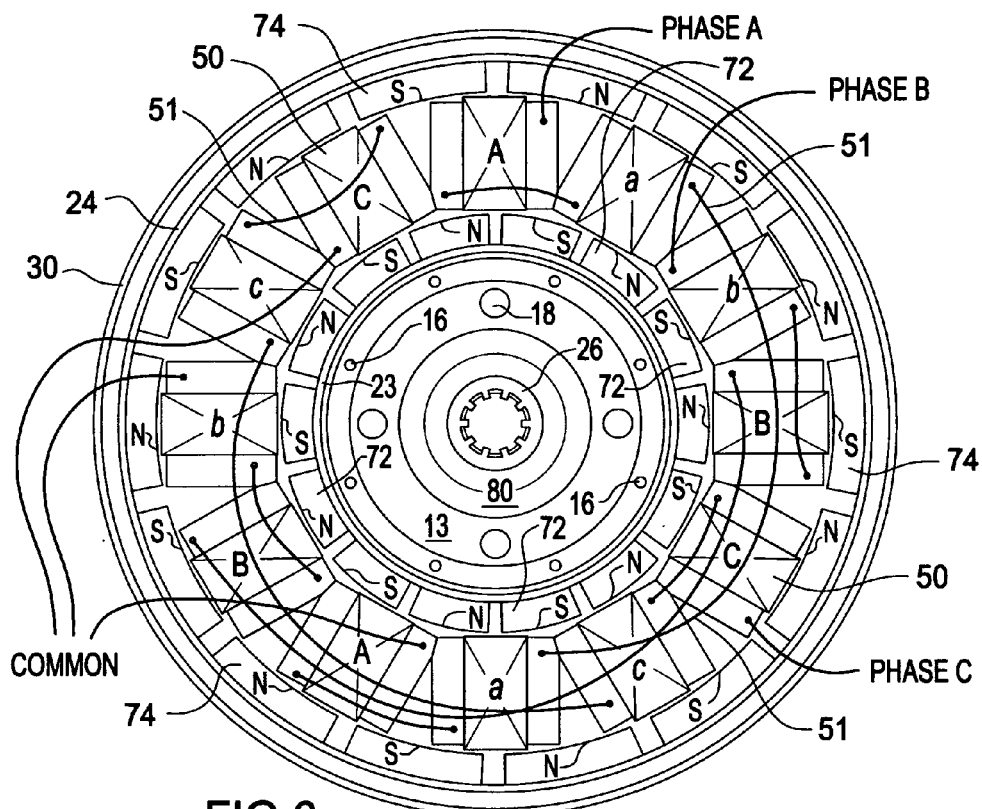
FIG. 6 is a simplified rendition of the cross-sectional diagram of FIG. 5, illustrating the wiring interconnections between the stator electromagnets required to form three sets of windings for three-phase commutation.

A plurality of outwardly-facing permanent magnets 72 are mounted on the outer cylindrical surface of inner rotor bowl 23. A plurality of inwardly-facing permanent magnets 74 are mounted on the inner cylindrical surface of outer rotor bowl 24. Mounting of permanent magnets 72, 74 to rotor bowls 23, 24 may be accomplished by means of screws and/or an adhesive, for example. Each of the permanent magnets 72, 74 preferably consists of a high-strength, rare-earth compound magnet consisting of Nd—Fe—B or Nd—Dy—Co—Fe—B, for high temperature operation, for example. Each of the permanent magnets 72, 74 is also preferably shaped to include curved inner and outer surfaces having a curvature matching the curvature of the cylindrical walls of inner and outer rotor bowls 23, 24. Permanent magnets 72, 74 are typically ½" thick, 2" long, and of sufficient width to subtend a 20° arc. Rare earth permanent magnets 72, 74 can be readily formed to most desired shapes. The use of permanent magnets 72, 74, formed to have curved inner and outer surfaces, allows them to lie flat on the cylindrical surfaces of inner and outer rotor bowls 23, 24 for added strength. In addition, the curved permanent magnets 72, 74 allow for a minimum gap between permanent magnets 72, 74 and the respective steel rotor bowls 23, 24 to which they are attached, thus providing improved magnetic coupling and increased power. Alternatively, off-the-shelf permanent magnets having flat inner and outer surfaces may be employed, in which case each of the permanent magnets 74 would consist of two flat magnets of the same polarity. Whether curved or flat, the permanent magnets 72, 74 are magnetized such that one of the inner and outer surfaces thereof is magnetic N and the opposite surface is magnetic S. The permanent magnets 72, 74 are mounted in an orientation that provides alternating polarity around the cylindrical surfaces of rotor bowls 23, 24 to which they are mounted, as illustrated in FIGS. 5 and 6. Thus, every one of permanent magnets 72 that is magnetic N is mounted opposite one of permanent magnets 74 that is magnetic S and vice versa. The cylindrical walls of inner and outer rotor bowls 23, 24 act as flux rings to complete the paths of the magnetic fields produced by permanent magnets 72, 74 and to thereby contain those magnetic fields, thus maximizing the power output of motor 100.

Stator assembly 10 and rotor assembly 20 are joined, during assembly of motor 100, by a double-row, angular contact bearing 80. Motor 100 is sealed against outside contaminants by means of a non-ferrous cylindrical cover 30 that is shaped like rotor bowls 22, 24 to have an outwardly-facing flat closed end and an inwardly-facing open end. Cylindrical cover 30 includes a central opening in its outwardly-facing closed end that is aligned with the central openings in rotor bowls 22, 24. When motor 100 is assembled, cover 30 fits over rotor bowl 24 such that the central opening in cover 30 engages an outwardly-protruding cylindrical extension 76 of drive hub 25 and such that the inner cylindrical surface of cover 30 fits over the peripheral edge of stator plate 12. Cover 30 is secured in place by means of a plurality of screws or bolts 78 inserted through holes provided in the cylindrical surface of cover 30 adjacent the open end thereof and into corresponding holes in the peripheral edge of stator plate 12. This arrangement provides contaminant sealing by means of cover 30 at both the central opening therein and at the open end thereof.

Motor 100 is constructed such that rotor bowl 24 has a large diameter/length ratio, thus providing a larger surface area for radiant cooling. Radiant cooling may be further enhanced with the addition of pin-finned heat sinks attached to the outer surface 11 of stator plate 12. Motor 100 may also be liquid-cooled if required in high power applications. Water cooling, for example, may be accomplished by nickel-plating the aluminum stator plate 12 and soldering a single turn of shaped copper tubing to the outer surface 11 thereof. A conventional liquid coolant may be circulated through this copper tubing to a heat exchanger. Alternatively, an entire coolant sleeve may be attached to outer surface 11 of stator plate 12. In very high power applications, stator plate 12 and cover 30 may be fabricated of copper, and permanent magnets 72, 74 may be fabricated of high-temperature N45HS material.

Referring now to FIG. 5 and the wiring diagram of FIG. 6, it can be seen that twelve stator electromagnet assemblies 50 are wired together in three sets or phases, Aa, Bb, Cc, of four each, by means of a plurality of interconnections 51. Two of the electromagnet assemblies 50 forming the set, Aa, for example, are adjacent to each other and are spatially displaced 180° from the other two electromagnet assemblies in the set Aa. The two adjacent electromagnet assemblies of a particular set are wound in opposite directions, so they exhibit reverse polarity when energized. The order of energization of the twelve electromagnet assemblies 50 is AabBCcaABbcC.

Motor 100 is commutated by employing three Hall effect sensors 80 that are mounted in a standard 120° configuration. Sensorless control may also be employed instead to control motor 100. Motor 100 may be energized by any standard three-phase brushless controller that is properly suited to match the output power capability of motor 100.

The illustrated preferred embodiment of motor 100 that utilizes twelve electromagnet assemblies 50, fourteen permanent magnets 72, and fourteen permanent magnets 74, eliminates a locked position of the rotor assembly 20 by insuring that at all times two-thirds of the electromagnet assemblies 50 are in a position to be energized and drive the rotor assembly 20 forward. Depending on the desired performance characteristics of motor 100, other numbers of electromagnet assemblies 50 and permanent magnets 72, 74 and ratios thereof are possible, such as 9/12, 9/6, 12/16, 12/10, and 12/8, for example.

An external conventional electronic controller is connected to motor 100 to sense the state of each of the three Hall effect sensors 80 and to supply operating power to the electromagnet assemblies 50. Motor 100 has been found to run optimally using a Controller capable of supplying 96-144 volts of operating power, but can run at lower voltages such as 12, 24, 36, 48, 60 or 72 volts. In contrast, prior art AC induction motors typically require higher operating voltages. Any of a number of off-the-shelf pulse width modulation (PWM) controllers, such as those manufactured by Kelly Controls, LLC, for example, may be employed to control motor 100. Such a controller measures speed and current drawn by motor 100 and includes three PWM channels to vary the current as the load varies.

The motor structure described in detail above permits motor 100 to be optimized for use in various applications, such as driving utility terrain vehicles, automobiles, trucks, and buses. It may also be utilized as a generator in wind turbine and motor/generator set applications. Optimization for different applications is accomplished by varying the Kv constant (RPM/voltage) within the range of less than 1.0 to more than 50, by varying the ratio of the number of electromagnet assemblies 50 to permanent magnets 72, 74, by varying the number of turns of copper windings 64 on each of the electromagnet assemblies 50, or by varying the wiring interconnection configuration of the electromagnet assemblies 50. For example, a thirteen-inch diameter embodiment of motor 100 having twelve electromagnet assemblies 50, fourteen permanent magnets 72, and fourteen permanent magnets 74, as illustrated, was tested and developed a constant torque of approximately 400 ft. lbs. and a constant power output of 10 kilowatts (13.41 horsepower).

I claim:

1. A brushless disk DC motor/generator comprising:
    a stationary, circular, non-ferrous stator plate having an inwardly-facing surface and an outwardly-facing surface and having a central circular opening therein;
    a circular stator hub having a central circular opening therein and having a stator end of reduced diameter, said stator end of said stator hub being positioned within said central circular opening in said stator plate, said stator hub being fixedly mounted to said stator plate, said stator hub being adapted for mounting to an external structure;
    a stator bearing having an outer cylindrical member fixedly positioned within said central circular opening in said stator hub, said stator bearing having an inner cylindrical member adapted for rotation with respect to said outer cylindrical member, said inner cylindrical member having a central circular opening therein;
    a plurality of electromagnet assemblies mounted to said inwardly-facing surface of said stator plate to form a circular ring of said electromagnet assemblies, a pair of free ends of a copper winding of each of said electromagnet assemblies exiting each of said electromagnet assemblies for routing and connection to effect a desired interconnection configuration of said plurality of electromagnet assemblies and to provide connection of said plurality of electromagnet assemblies to an external power controller;
    an inner cylindrical ferrous rotor bowl having an inwardly-facing open end and an outwardly-facing flat closed end, said closed end of said inner rotor bowl having a central circular opening therein, said inner rotor bowl having a plurality of outwardly-facing permanent magnets mounted to form an inner circular ring of permanent magnets on an outer cylindrical surface thereof;
    an outer cylindrical ferrous rotor bowl having an inwardly-facing open end and an outwardly-facing closed end, said closed end of said outer rotor bowl having a central circular opening therein, said outer cylindrical rotor bowl having a diameter greater than the diameter of said inner cylindrical rotor bowl and a length equal to the length of said inner cylindrical rotor bowl, said outer cylindrical rotor bowl having a plurality of inwardly-facing permanent magnets mounted to form an outer circular ring of permanent magnets on an inner cylindrical surface thereof, said outer circular ring of permanent magnets being axially and diametrically aligned with and equal in number to said plurality of permanent magnets forming said inner circular ring of permanent magnets; and a cylindrical drive hub positioned within said inner rotor bowl in axial alignment with said stator plate, said stator hub, and said inner and outer rotor bowls, said drive hub having a circular mounting flange, said inner and outer rotor bowls being fixedly connected to said circular mounting flange for rotation in concert therewith, said inner and outer rotor bowls being concentrically positioned such that said inner and outer circular rings of permanent magnets mounted thereon are axially and diametrically aligned with said circular ring of electromagnet assemblies on said stator plate, such that said inner circular ring of permanent magnets rotates in close proximity to and inside said circular ring of electromagnet assemblies, and such that said outer circular ring of permanent magnets rotates in close proximity to and outside said circular ring of electromagnet assemblies, said drive hub having a central opening therein for receiving an external drive shaft, a stator end of said drive hub being fixedly positioned within said inner cylindrical member of said stator bearing, a rotor end of said drive hub extending through said central openings in said inner and outer rotor bowls.

2. A brushless disk DC motor/generator as in claim 1, further comprising a non-ferrous cylindrical cover having an inwardly-facing open end and an outwardly-facing closed end, said closed end of said cylindrical cover having a central circular opening therein aligned with the central openings in said inner and outer rotor bowls, said cylindrical cover being positioned over said outer rotor bowl in spaced relationship therewith such that said rotor end of said drive hub extends through said central opening in said cylindrical cover, said cylindrical cover being attached to said stator plate such that an inner cylindrical surface of said cylindrical cover proximate said open end thereof is in contact with a peripheral edge surface of said stator plate to provide contaminant sealing of said motor/generator.

3. A brushless disk DC motor/generator as in claim 2, wherein said cylindrical cover comprises a heat-conducting material.

4. A brushless disk DC motor/generator as in claim 1, wherein each one of said plurality of electromagnet assemblies comprises a tape-wound amorphous metal core having a rectangular central opening therein and rounded exterior corners, said amorphous metal core having a selected number of turns of copper wire wound on an exterior surface thereof.

5. A brushless disk DC motor/generator as in claim 4, wherein said plurality of electromagnet assemblies are individually encapsulated in a volume of heat-conducting epoxy material.

6. A brushless disk DC motor/generator as in claim 4, wherein said plurality of electromagnet assemblies are collectively encapsulated in a volume of heat-conducting epoxy material.

7. A brushless disk DC motor/generator as in claim 1, wherein said stator plate comprises a heat-conducting material.

8. A brushless disk DC motor/generator as in claim 7, wherein said heat-conducting material comprises copper.

9. A brushless disk DC motor/generator as in claim 7, wherein said heat-conducting material comprises aluminum.

10. A brushless disk DC motor/generator as in claim 1, wherein each of said inner and outer rotor bowls comprises a spun steel rotor bowl.

11. A brushless disk DC motor/generator as in claim 1, wherein each of said permanent magnets mounted on said inner and outer rotor bowls has curved inner and outer surfaces of matching curvature, said curvature of said inner and outer surfaces of said permanent magnets matching the curvature of said cylindrical surfaces of said inner and outer rotor bowls.

12. A brushless disk DC motor/generator as in claim 1, wherein said plurality of electromagnet assemblies mounted on said stator plate numbers twelve, said plurality of permanent magnets mounted on said inner rotor bowl numbers fourteen, and said plurality of permanent magnets mounted on said outer rotor bowl numbers fourteen.

13. A brushless disk DC motor/generator as in claim 1, wherein said interconnection configuration of said plurality of electromagnet assemblies comprises a selected one of a series, parallel, wye, and delta interconnection configuration.

14. A brushless disk DC motor/generator as in claim 1, wherein said central opening in said drive shaft comprises a splined female shaft receptacle for receiving a mating splined external drive shaft.

15. A brushless disk DC motor/generator as in claim 1, wherein said outer cylindrical member of said stator bearing is pressed into said central circular opening in said stator hub.

16. A brushless disk DC motor/generator as in claim 1, wherein said stator end of said drive hub is pressed into said inner cylindrical member of said stator bearing.

17. A brushless disk DC motor/generator as in claim 1, wherein said stator hub is fixedly mounted to said stator plate such that an inner face of said stator end of said stator hub is flush with said outwardly-facing surface of said stator plate.

\* \* \* \* \*